(12) United States Patent
Taira et al.

(10) Patent No.: US 11,329,418 B2
(45) Date of Patent: May 10, 2022

(54) JIG FOR CONNECTOR PLUG, CONNECTOR PLUG AND CABLE WITH CONNECTOR PLUG

(71) Applicant: SEIKOH GIKEN Co., Ltd., Matsudo (JP)

(72) Inventors: Junji Taira, Matsudo (JP); Shuichi Takashi, Matsudo (JP); Naotoshi Shiokawa, Matsudo (JP); Masayuki Jibiki, Matsudo (JP)

(73) Assignee: SEIKOH GIKEN Co., Ltd., Matsudo (JP)

( * ) Notice: Subject to any disclaimer, the term of this patent is extended or adjusted under 35 U.S.C. 154(b) by 0 days.

(21) Appl. No.: 17/190,403

(22) Filed: Mar. 3, 2021

(65) Prior Publication Data

US 2021/0281005 A1  Sep. 9, 2021

Related U.S. Application Data

(60) Provisional application No. 62/985,871, filed on Mar. 5, 2020.

(30) Foreign Application Priority Data

Mar. 31, 2020   (JP) .............................. JP2020-064307

(51) Int. Cl.
*H01R 13/506* (2006.01)
*H01R 13/625* (2006.01)

(52) U.S. Cl.
CPC ......... *H01R 13/506* (2013.01); *H01R 13/625* (2013.01)

(58) Field of Classification Search
CPC .. H01R 13/506; H01R 13/625; H01R 13/639; H01R 13/6275; H01R 13/641
See application file for complete search history.

(56) References Cited

U.S. PATENT DOCUMENTS 5,211,572 A *  5/1993  Comstock .......... H01R 13/6392
                                              439/372
9,958,623 B1   5/2018  Taira et al.
(Continued)

FOREIGN PATENT DOCUMENTS

JP           2019-12253 A       1/2019

OTHER PUBLICATIONS

Extended European Search Report dated Jul. 16, 2021.

*Primary Examiner* — Oscar C Jimenez
(74) *Attorney, Agent, or Firm* — Yokoi & Co., U.S.A.; Toshiyuki Yokoi

(57) ABSTRACT

A connector plug has a connector plug body, a slider supported on the connector plug body and a jig attachable to the slider. The jig has an insertion portion which can be inserted into a slot of the slider and an operation portion extended from the insertion portion. The insertion portion has first and second insertion portions separated from each other by a predetermined distance. The slider can be moved in the detaching direction when the jig is moved in the detaching direction in a state that a first locking portion of the first insertion portion and a second locking portion of the second insertion portion are locked to the inner wall of the slot, and the locked state of the first locking portion and the second locking portion can be released when a force is applied to the operation portion in an inside direction to shorten the predetermined distance.

8 Claims, 11 Drawing Sheets

(56) References Cited

U.S. PATENT DOCUMENTS

| | | | |
|---|---|---|---|
| 10,069,242 B1* | 9/2018 | Wen | H01R 13/6275 |
| 2017/0357060 A1 | 12/2017 | Jones | |
| 2018/0156988 A1 | 6/2018 | Gniadek et al. | |
| 2018/0341069 A1 | 11/2018 | Takano et al. | |
| 2019/0011647 A1 | 1/2019 | He | |
| 2019/0361177 A1* | 11/2019 | Aoshima | G02B 6/3825 |

* cited by examiner

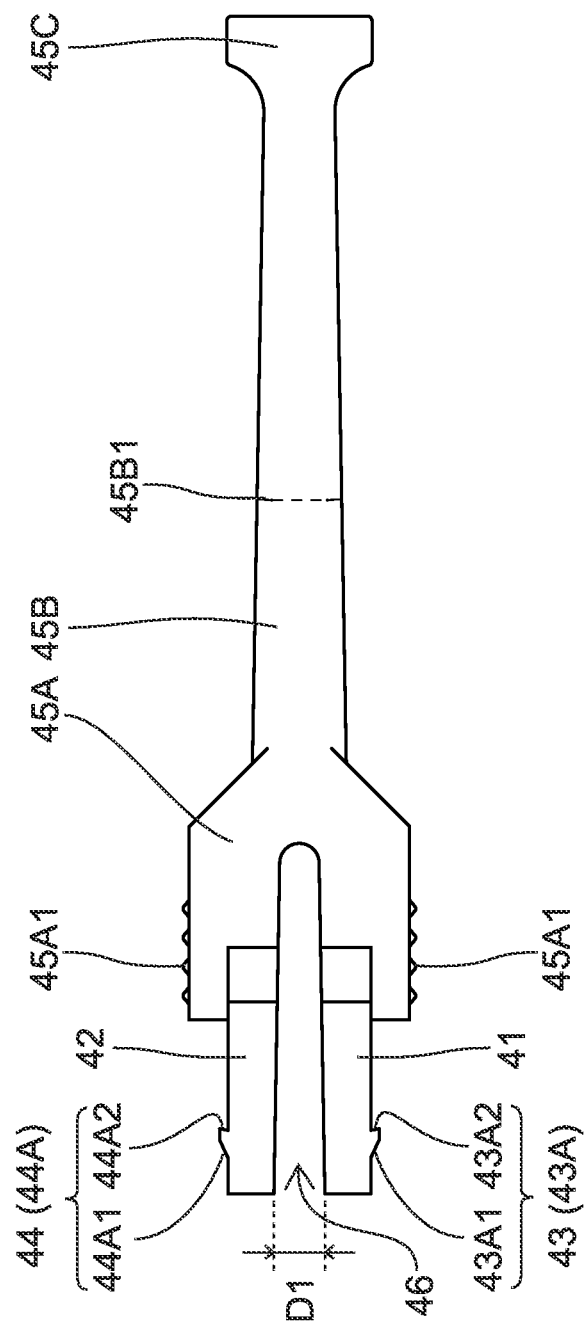

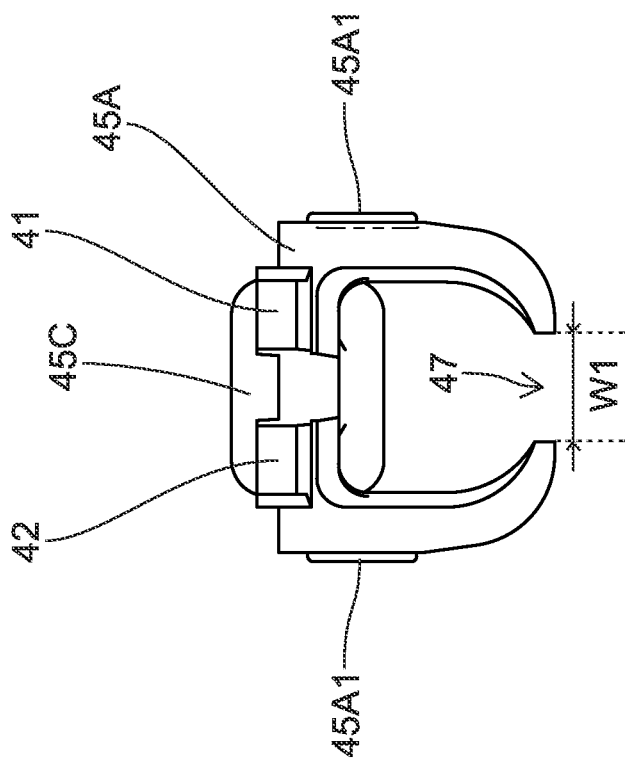

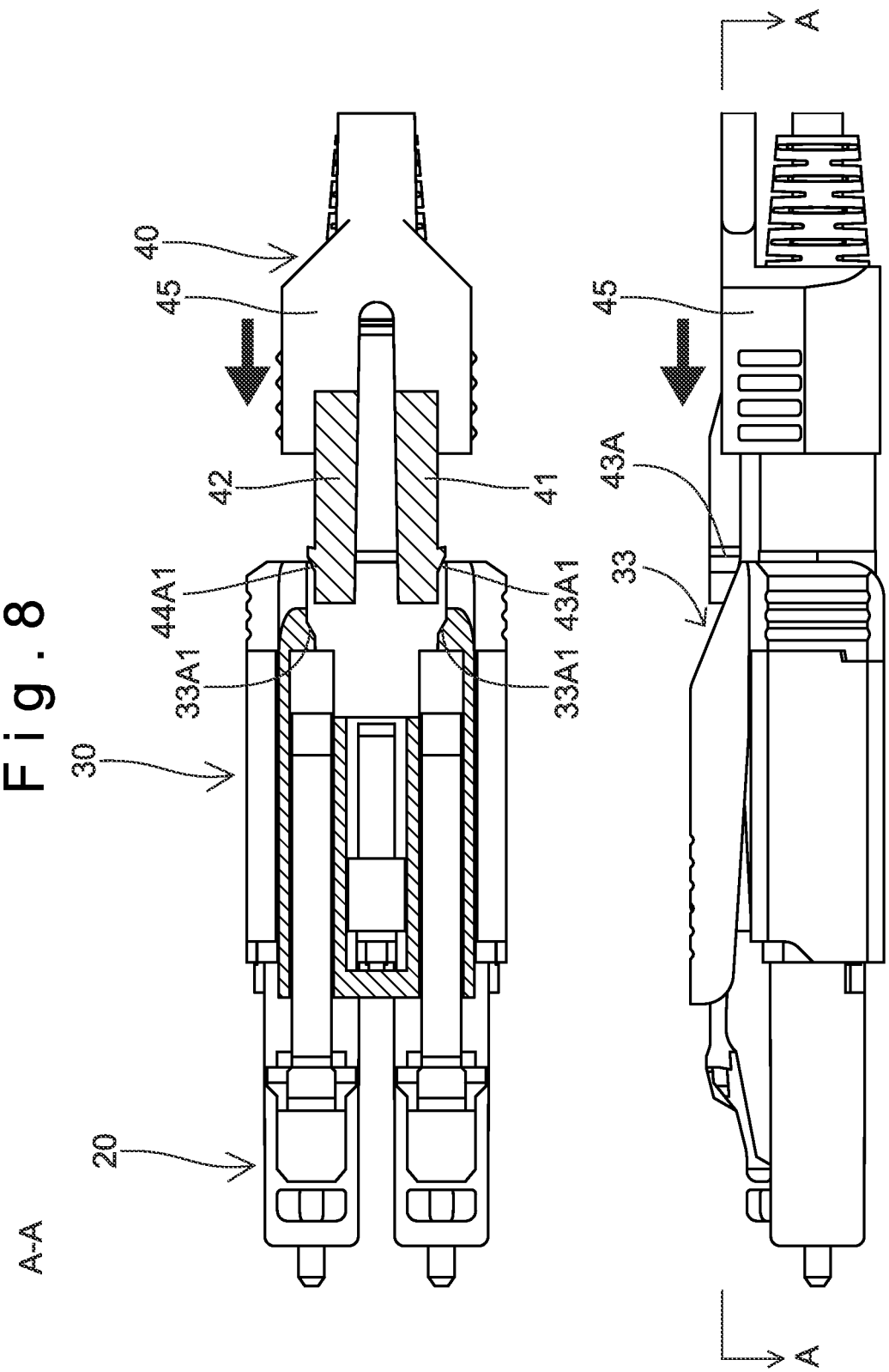

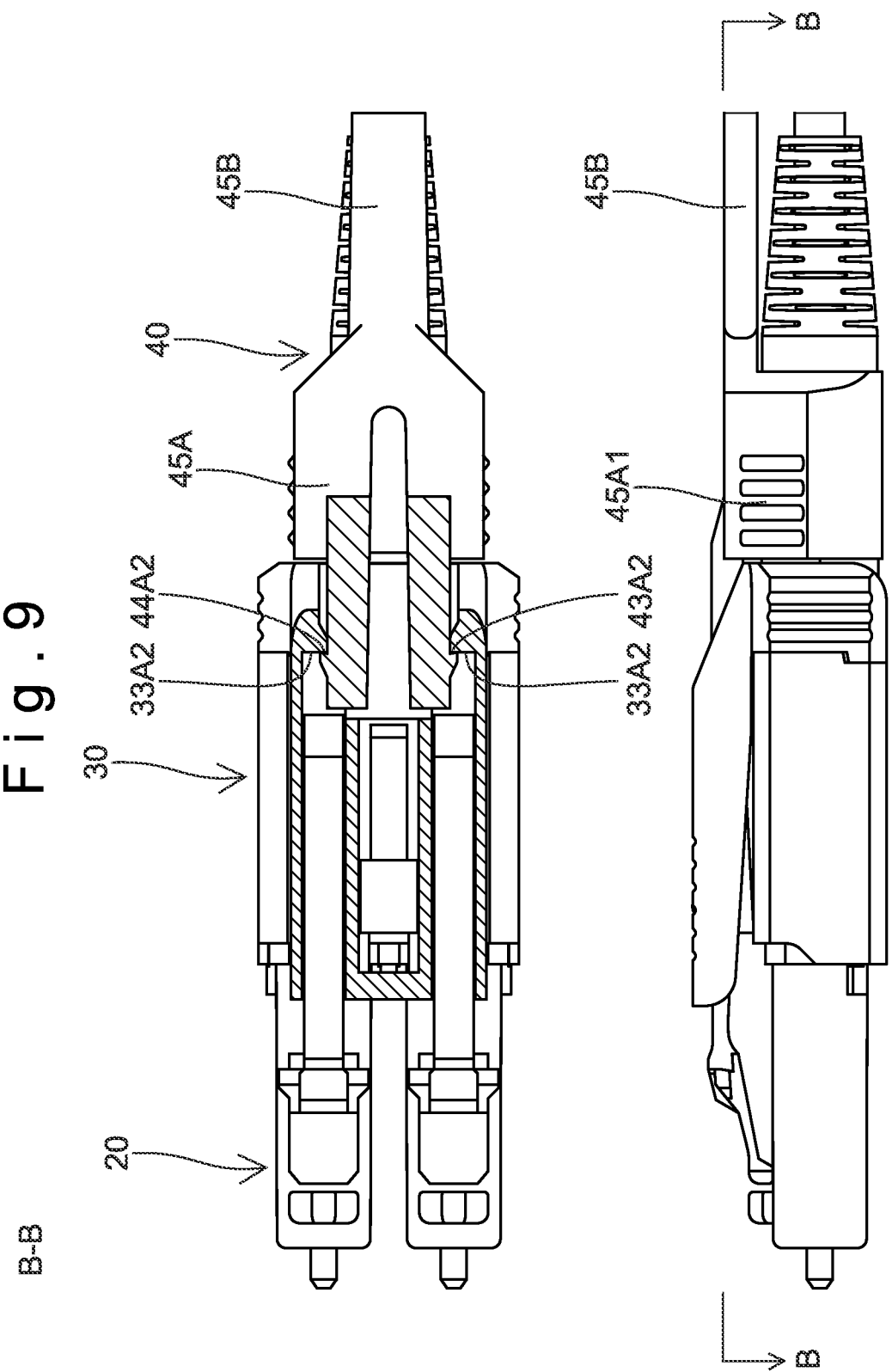

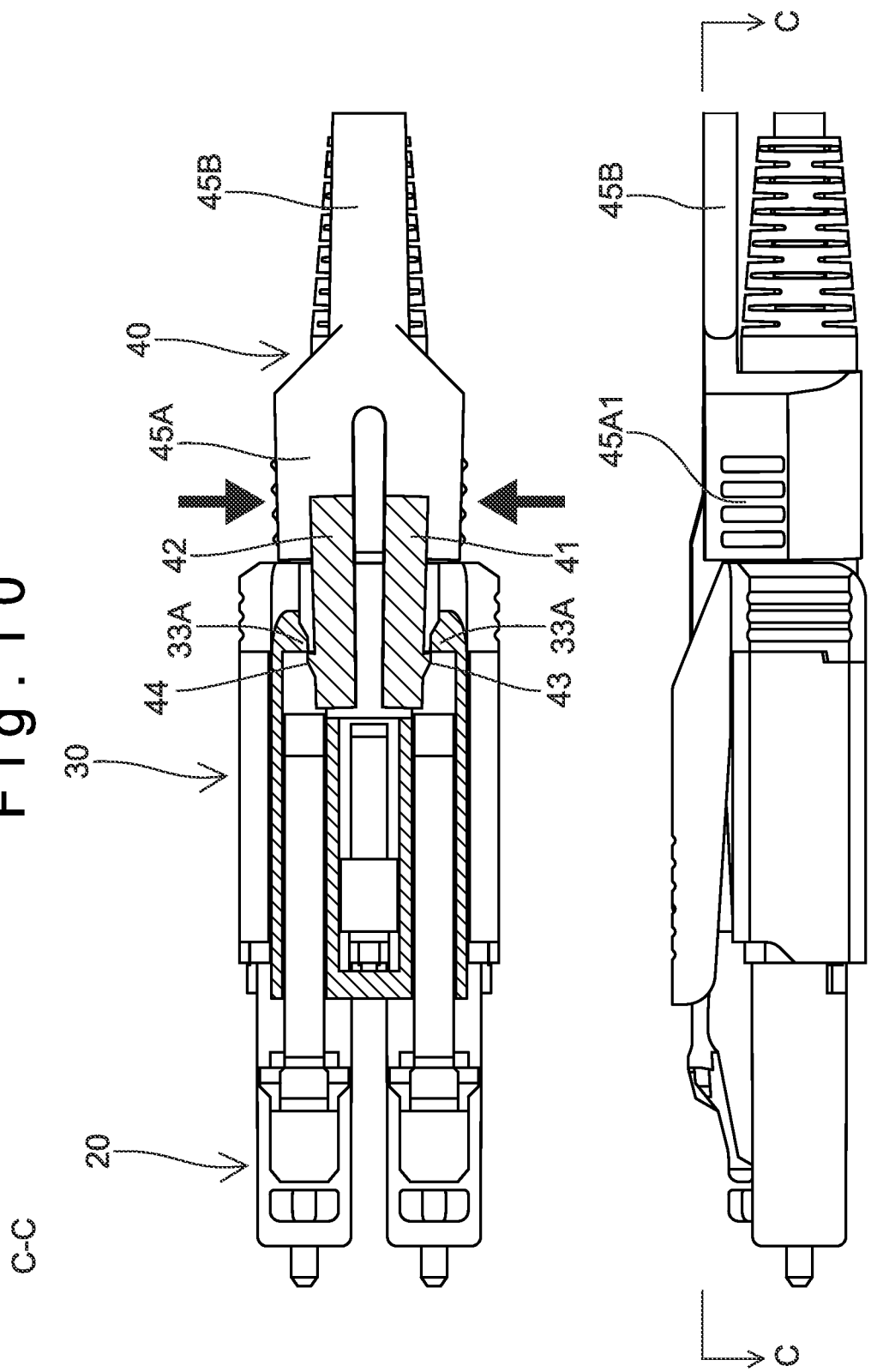

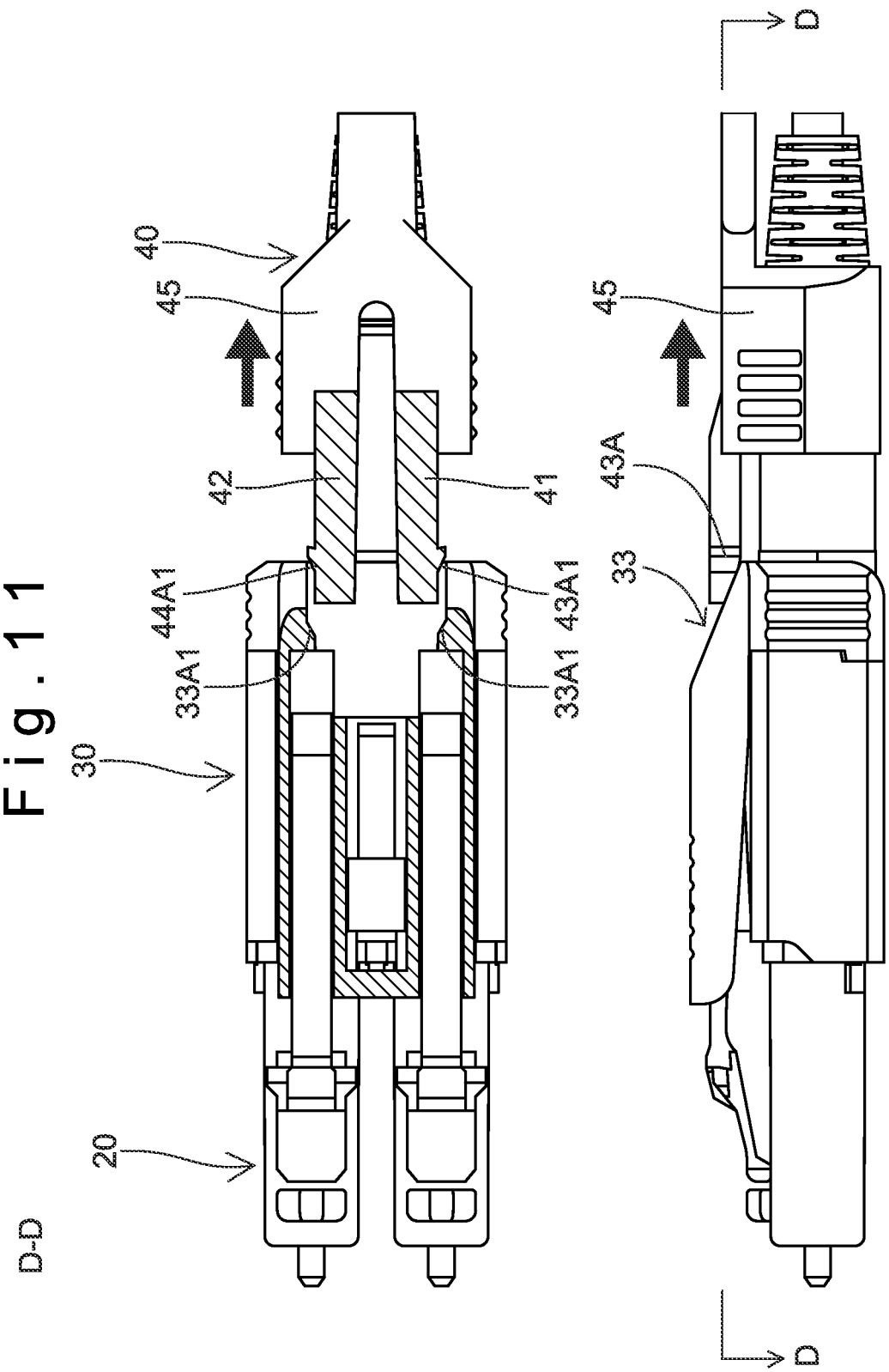

JIG FOR CONNECTOR PLUG, CONNECTOR PLUG AND CABLE WITH CONNECTOR PLUG

CROSS-REFERENCES TO RELATED APPLICATIONS

This patent specification claims priority to U. S. Provisional Application Ser. No. 62/985,871, filed Mar. 5, 2020 and Japanese patent application, No. 2020-064307 filed on Mar. 30, 2020 in the Japan Patent Office, the entire contents of which are incorporated by reference herein.

BACKGROUND OF THE INVENTION

1. Field of the Invention

The present invention relates to a jig for connector plug, a connector plug and a cable with connector plug.

2. Description of Related Art

An optical fiber cable is connected with optical modules such as a receiver and a transmitter or another optical fiber cable via an adapter (including a so-called receptacle). Accordingly, a connector plug to be fitted to the adapter is provided on the end portion of the optical fiber cable. In the communication devices on which the optical modules are mounted and the devices such as a fiber distribution frame for relaying the optical fiber cables with each other, a plurality of adaptors may be densely provided from the viewpoint of downsizing the device, for example. A jig for facilitating the operation of attaching and detaching the connector plug to and from the densely provided adapters is known.

On the other hand, the jig attached to the connector plug may decrease the workability of handling the cables remarkably when the jig contacts the cables and obstructs the operation. In addition, when enough space is available around the adapter, there is no need to attach the jig to the connector plug. As described above, it is preferable to attach the jig to the connector plug in some cases, while it is preferable not to attach the jig to the connector plug in the other cases. Accordingly, the convenience of the connector plug can be increased by adopting the structure capable of letting the user arbitrarily select whether or not the jig is attached.

In the jig described in Patent Document 1, the jig can be attached to a slider by inserting an insertion piece of the jig into the slot of a slider supported by a connector plug body. When the jig is pulled in a detaching direction in a state that the slider and the jig are in parallel (horizontal) with each other, a locking protrusion of the jig and a locking portion of the slider are locked with each other and the slider is moved in the detaching direction.

As a result, the connector plug can be pulled out of the adapter. In addition, when the jig is pulled in the detaching direction in a state that the jig is inclined with respect to the slider, the locking between the locking protrusion and the locking portion is released. As a result, the jig can be detached from the slider.

[Patent Document 1] Japanese Unexamined Patent Application Publication No. 2019-012253

BRIEF SUMMARY OF THE INVENTION

In the jig disclosed in Patent Document 1, the jig can be attached and detached by elastically deforming and bending an upper surface portion of the locking portion of a slider. The upper surface portion of the locking portion of the slider should have a shape allowing a predetermined amount of the elastic deformation. Thus, it is difficult to increase the thickness of the upper surface portion of the locking portion of the slider. In addition, the connector plug is generally designed considering a pull-out force of 20N or less (approximately 15N) when the connector plug is pulled out of the adapter. Accordingly, it is difficult to design the connector plug so as to ensure sufficient strength even when the external force exceeding the assumed pull-out force is applied. As a result, when the jig is pulled in the detaching direction by the force stronger than the assumed force in a state that the slider and the jig are in parallel (horizontal) with each other, the locking portion may be damaged. In addition, when the jig is inclined with respect to the slider, an inclined angle of 25° or less (approximately 20°) is assumed. Accordingly, when the jig is inclined upward exceeding the assumed inclination angle, the locking portion may be damaged.

The present invention provides a jig used for the inserting and detaching operation of the connector plug fitted to an adapter and can be used even when the adapters are densely provided. In addition, the present invention provides a connector plug having the above described jig and the cable with the connector plug. Consequently, it contributes the downsizing of the device on which the adapters are installed.

A jig of one embodiment of the present invention is a jig used for a connector plug, the connector plug having: a connector plug body to be fitted to an adapter; and a slider supported on the connector plug body so as to be movable in a detaching direction which is a direction of detaching the connector plug body from the adapter, a fitting between the adapter and the connector plug body being released when the slider is moved in the detaching direction with respect to the connector plug body, the jig having: an insertion portion which can be inserted into a slot provided on the slider in an inserting direction which is an opposite direction of the detaching direction; and an operation portion extended in the detaching direction from the insertion portion, the insertion portion is comprised of a first insertion portion and a second insertion portion which are separated from each other by a predetermined distance, the first insertion portion has a first locking portion at an opposite side of the second insertion portion so that the first locking portion can be locked to an inner wall of the slot, the second insertion portion has a second locking portion at an opposite side of the first insertion portion so that the second locking portion can be locked to the inner wall of the slot, the slider can be moved in the detaching direction when the jig is moved in the detaching direction in a state that the first locking portion and the second locking portion are locked to the inner wall of the slot, and the state that the first locking portion and the second locking portion are locked to the inner wall of the slot can be released when a force is applied to the operation portion in an inside direction to shorten the predetermined distance.

In the above described configuration, the first insertion portion, the second insertion portion and the operation portion can be integrally formed with each other by a same member, a slit can be provided between the first insertion portion and the second insertion portion so that the first insertion portion and the second insertion portion are separated from each other by the predetermined distance, and the predetermined distance can be shortened by elastically deforming the operation portion.

In the above described configuration, the first locking portion can include a first protrusion protruded from the first insertion portion toward an inner wall of the slot, and the second locking portion can include a second protrusion protruded from the second insertion portion toward an inner wall of the slot.

In the above described configuration, the adapter and the connector plug body can be fitted with each other when the jig is moved in the inserting direction so that an end portion in the inserting direction of the jig pushes the connector plug.

In the above described configuration, the operation portion can have a cylindrical portion formed in a cylindrical shape, an optical fiber cable extending from the connector plug in the detaching direction and a boot covering the optical fiber cable can be inserted inside the cylindrical portion, the cylindrical portion can have a notch notched over an entire length of the cylindrical portion in an axial direction, a width of the notch can be larger than a diameter of the optical fiber cable and smaller than a maximum diameter of the boot, and the cylindrical portion can have a size to be housed inside an outer shape of the connector plug when viewed from the detaching direction in a state that the insertion portion is inserted into the slot.

In the above described configuration, the operation portion can have a breakable portion at a position located nearer to the insertion portion compared to an end portion of the boot in the detaching direction in a state that the insertion portion is inserted into the slot.

A connector plug of one embodiment of the present invention is a connector plug, having: a connector plug body to be fitted to an adapter; and a slider supported on the connector plug body so as to be movable in a detaching direction which is a direction of detaching the connector plug body from the adapter, a fitting between the adapter and the connector plug body being released when the slider is moved in the detaching direction with respect to the connector plug body, the connector plug further having a jig detachably attachable to the slider, the jig having: an insertion portion which can be inserted into a slot provided on the slider in an inserting direction which is an opposite direction of the detaching direction; and an operation portion extended in the detaching direction from the insertion portion, the insertion portion is comprised of a first insertion portion and a second insertion portion which are separated from each other by a predetermined distance, the first insertion portion has a first locking portion at an opposite side of the second insertion portion so that the first locking portion can be locked to an inner wall of the slot, the second insertion portion has a second locking portion at an opposite side of the first insertion portion so that the second locking portion can be locked to the inner wall of the slot, the slider can be moved in the detaching direction when the jig is moved in the detaching direction in a state that the first locking portion and the second locking portion are locked to the inner wall of the slot, and the state that the first locking portion and the second locking portion are locked to the inner wall of the slot can be released when a force is applied to the operation portion in an inside direction to shorten the predetermined distance.

A cable of one embodiment of the present invention is a cable to which the connector plug is attached at an end portion of the cable.

The present invention can provide a jig capable of being easily attached to and detached from the connector plug and ensuring the strength avoiding the damage of the locking portion of the connector plug even when the attachment and the detachment are repeated. In addition, the present invention can provide a connector plug having the above described jig and a cable with the connector plug. Since the strength of the connector plug is increased, the connector plug is hardly damaged even if the force exceeding the assumed force is applied when the connector plug is attached to or detached from the adapter and even if the connector plug is deformed into an unexpected shape when the jig is detached from the connector plug.

BRIEF DESCRIPTION OF THE DRAWINGS

FIG. 6 is a plan view of the jig 40.

FIG. 7 is a side view of the jig 40 viewed from the inserting direction.

FIG. 8 is a drawing showing a state of attaching the jig 40 to the slider 30.

FIG. 9 is a drawing showing a state that the jig 40 is attached to the slider 30.

FIG. 10 is a drawing showing a state of detaching the jig 40 from the slider 30.

FIG. 11 is a drawing showing a state that the jig 40 is detached from the slider 30.

DETAILED DESCRIPTION OF THE INVENTION

Hereafter, embodiments of the present invention will be explained with reference to the drawings shown as an example.

Figure 1:
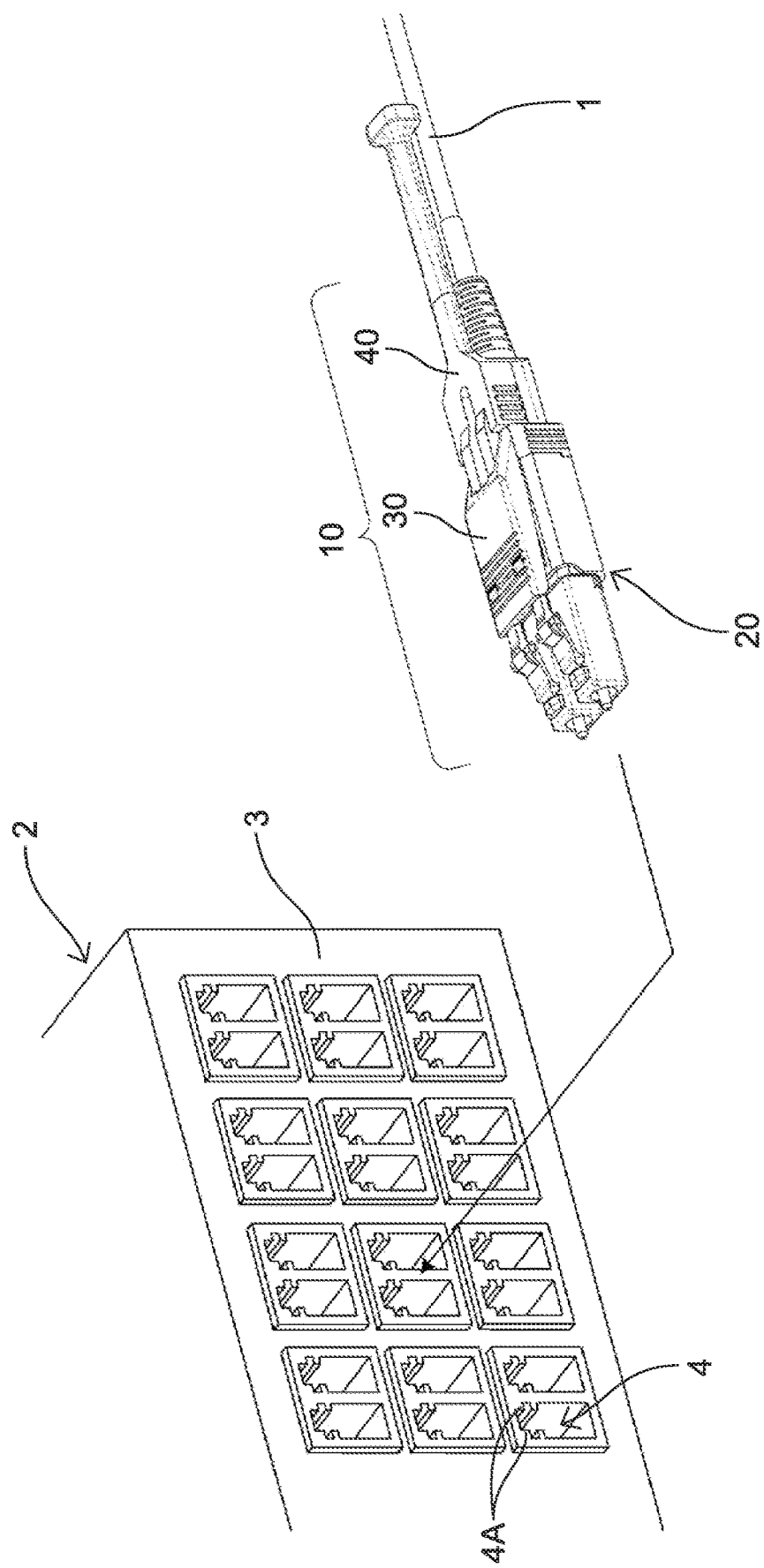
FIG. 1 is a perspective view for explaining an outline of a connector plug 10.

FIG. 1 is a perspective view for explaining an outline of a connector plug 10. As shown in FIG. 1, the connector plug 10 is attached to the end portion of an optical fiber cable 1. The connector plug 10 attached to the optical fiber cable 1 is fitted to an adapter 4 (into a fitting hole) provided on a panel 3 of a device 2. Consequently, the optical fiber cable 1 is connected with the optical module or another optical fiber cable via the connector plug 10 and the adapter 4. In the following explanation, the direction of detaching (removing) the connector plug 10 from the adapter 4 is referred to as a detaching direction (removing direction), and the direction of inserting (attaching) the connector plug 10 to the adapter 4 is referred to as an inserting direction (attaching direction), where the inserting direction is an opposite direction of the detaching direction.

The connector plug 10 is comprised of a connector plug body 20, a slider 30 and a jig 40. The connector plug body 20 is a portion of the connector plug 10 to be fitted to the adapter 4 and provided on the end portion of the connector plug 10 in the inserting direction. The slider 30 is provided on an upper surface of the connector plug body 20 and supported on the connector plug body 20 so as to be movable in the inserting direction and the detaching direction. The jig 40 is configured to be detachably attachable to the connector plug body 20 and the slider 30 from the detaching direction.

Figure 2:
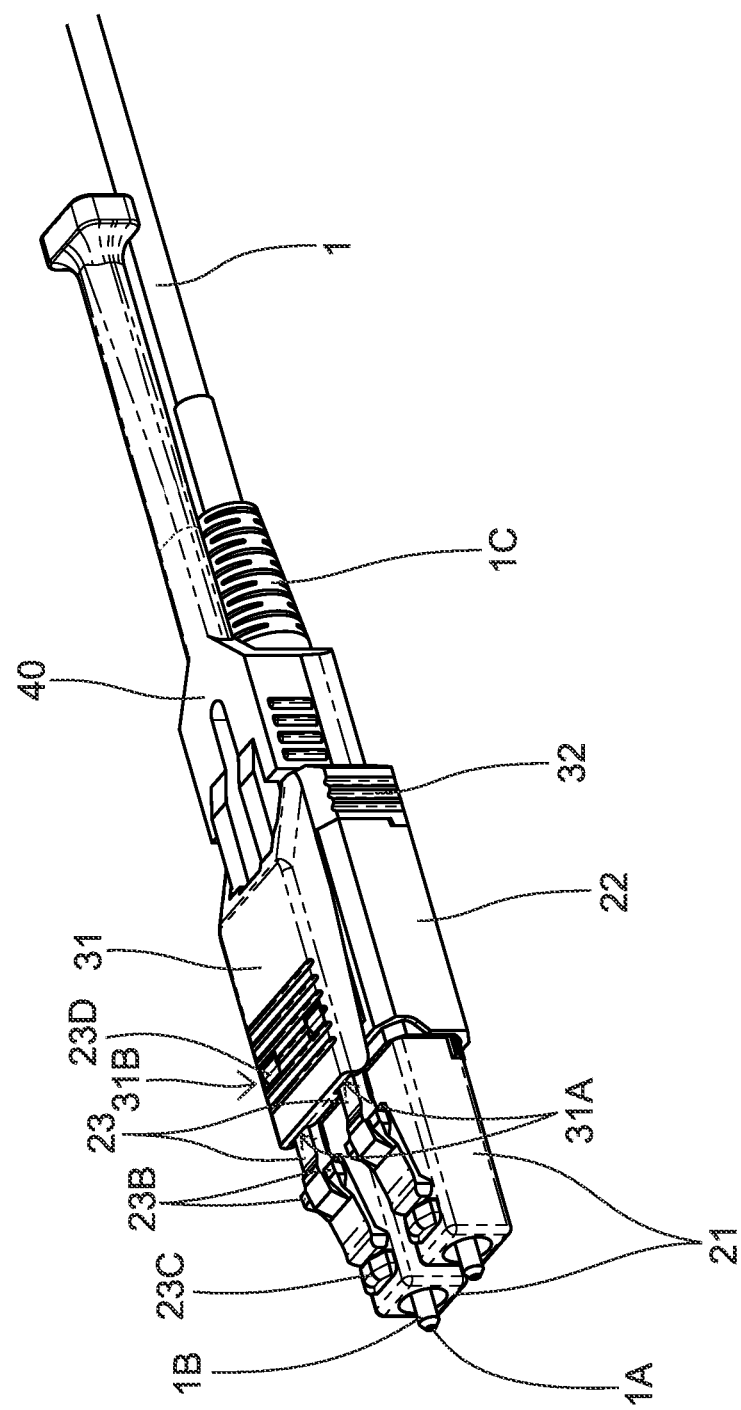
FIG. 2 is a perspective view of the connector plug 10 viewed from an inserting direction.

FIG. 2 is a perspective view of the connector plug 10 viewed from the inserting direction. As shown in FIG. 2, the connector plug body 20 is comprised of two plug frames 21 formed in a cylindrical shape and a latch frame 22 for supporting the plug frames 21. A ferrule 1B for holding an optical fiber 1A of the optical fiber cable 1 is inserted into the plug frames 21 and the latch frame 22 and projected from the end portion of the plug frames 21 in the inserting direction. The optical fiber cable 1 drawn out of the end portion of the latch frame 22 in the detaching direction is covered with a boot 1C for preventing damage of the optical fiber cable 1 caused by the bending of the cable. Although the explanation is made by using a double-core cable having two optical fibers 1A in the present embodiment, the optical fiber cable 1 is not limited to the double-core cable. The present invention can be similarly applied to a single-core cable having one optical fiber or a multi-core cable having three or more optical fibers by changing the number of the plug frames 21.

The plug frames 21 are provided on each of the ferrules 1B. Each of the plug frames 21 is formed in a cylindrical shape to cover the ferrule 1B from an outer side. An inner wall of each of the plug frames 21 has a circular shape when viewed from the inserting direction. The ferrule 1B holding the optical fiber 1A is arranged at the center of the inner wall. An outer shape of each of the plug frames 21 is formed in a rectangular shape matched with the shape of the inner wall of the adapter 4. A protrusion protruded upward is formed on an upper surface of each of the plug frames 21 near an end portion in the inserting direction.

The latch frame 22 is formed in a cylindrical shape having an approximately rectangular shape to cover the two plug frames 21 from the outer side. Two latches 23 extending from a support portion 23A (shown in FIG. 3) of the latch frame 22 located near the end portion in the detaching direction toward the inserting direction are provided on an upper surface of the latch frame 22. The two latches 23 are arranged on the upper surfaces of the two plug frames 21 respectively. A locking portion 23B having locking protrusions which are protruded toward both sides in the width direction is formed on each of the latches 23. When the locking portion 23B is locked (latched) to the adapter 4, the connector plug 10 is fitted to the adapter 4. A predetermined interval (clearance) in the vertical direction is formed between the plug frames 21 and the latches 23. However, the lower surface of the latches 23 is gradually inclined to approach the upper surface of the plug frames 21 at the inserting direction side than the locking portion 23B and contacted with the upper surface the plug frame 21 at a tip portion 23C located near the end portion of the plug frame 21 in the inserting direction. When a downward force is applied to the latches 23 to elastically deform the latches 23, the distance between the plug frames 21 and the latches 23 is changed and the locking portion 23B can be moved in the vertical direction (upward and downward). When the locking portion 23B is moved downward, the contact between a locking piece 4A (shown in FIG. 1) provided on the adapter 4 and the locking portion 23B is avoided and the connector plug 10 can be inserted into and removed from the adapter 4. When the elastic deformation of the latches 23 is released in a state that the connector plug 10 is inserted into the adapter 4, the locking portion 23B is locked by the locking piece 4A and the connector plug 10 can be fixed to the adapter 4 in a state that the connector plug 10 is inserted into the adapter 4. When the downward force is applied to the latches 23 to elastically deform the latches 23, the tip portion 23C serves as a fulcrum to receive the force together with the support portion 23A. In the present embodiment, the explanation is made regarding the surface on which the latches 23 are formed as the upper surface in the outer surface of the latch frame 22. Needless to say, when the direction of the adapter 4 is different, the connector plug 10 is attached to the adapter 4 in a state that the surface on which the latches 23 are formed is directed to the other surfaces.

The slider 30 is comprised of a cover portion 31 arranged on an upper surface of the latch frame 22 and a gripping portion 32 arranged on the detaching direction side (rear side) of the latch frame 22. The upper surface of the latch frame 22 and the lower surface of the cover portion 31 of the slider 30 are faced with each other interposing the latches 23 between them. Two sliding grooves 31A for housing the two latches 23 are formed on the cover portion 31. The sliding grooves 31A extend in the sliding direction of the slider 30 (i.e., inserting direction/detaching direction of the connector plug 10). Since the latches 23 are housed in the sliding grooves 31A, the slider 30 can be moved in the inserting direction and the detaching direction with respect to the upper surface of the latch frame 22. When the force applied to the slider 30 in the detaching direction is released, the elastic deformation of the latches 23 is released and the slider 30 is slid toward the inserting direction.

A sliding protrusion 23D protruded upward is formed on the upper surface of each of the latches 23. In addition, the sliding groove 31A of the cover portion 31 communicates with a sliding hole 31B penetrating upward at a position corresponding to the sliding protrusion 23D. The sliding protrusion 23D is inserted into the sliding hole 31B so that the sliding protrusion 23D can be slid in the inserting direction and the detaching direction in the sliding hole 31B. The sliding protrusion 23D has an inclined surface so that a protruded amount is gradually reduced toward the inserting direction. As described later, when the slider 30 is slid with respect to the latches 23, the lower surface of the slider 30 is slid on the inclined surface of the sliding protrusion 23D and the slider 30 is configured to push the latches 23 downward. Note that the configuration of the slider 30 is not limited to the above described configuration as long as the slider 30 has the configuration capable of moving with respect to the upper surface of the latch frame 22. For example, it is possible to form the sliding grooves on the upper surface of the latch frame 22 so that the slider 30 slides on the sliding grooves.

The gripping portion 32 is formed integrally with the cover portion 31. The gripping portion 32 covers the end portion of the plug body 20 in the detaching direction from the outer side. The gripping portion 32 is linked with the cover portion 31 and slid in the inserting direction and the detaching direction on the outer periphery of the end portion of the detaching direction side of the plug body 20. Although the gripping portion 32 is a portion gripped by the operator when the slider 30 is slid, the operator do not have to grip the gripping portion 32 when the later described jig 40 is used.

Figure 3:
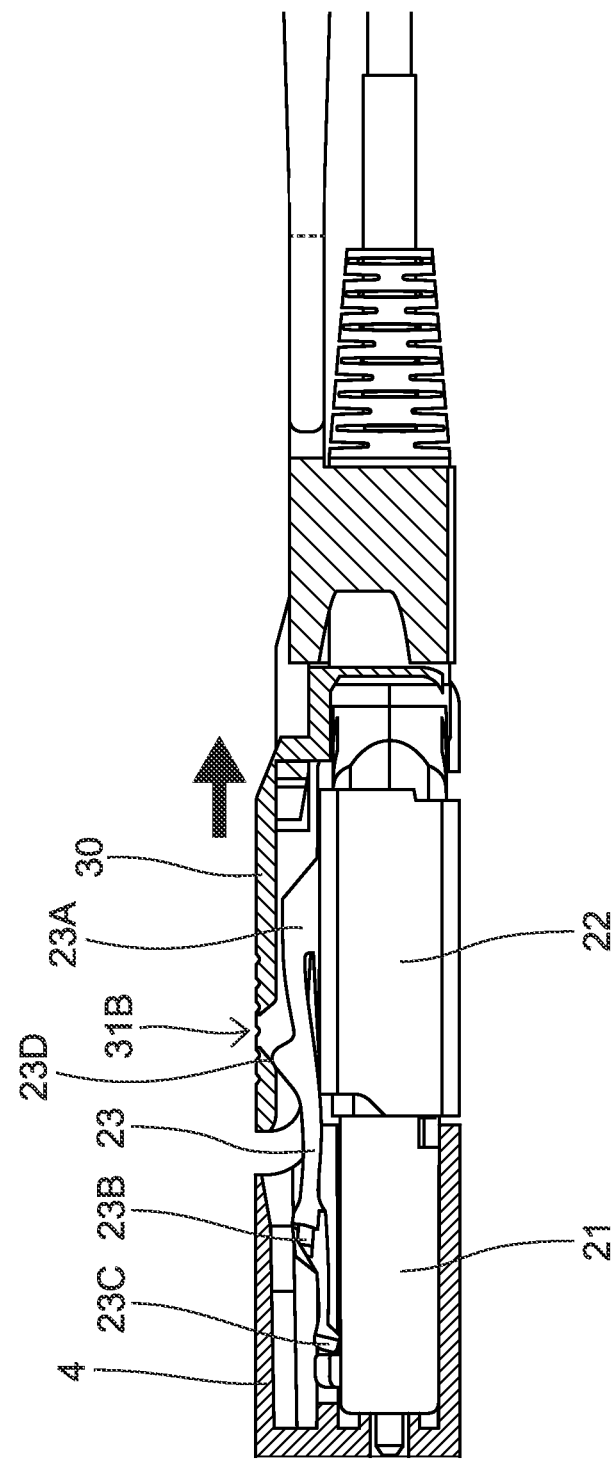
FIG. 3 is a cross-sectional view showing the connector plug 10 in a state that a slider 30 is slid in a detaching direction.
Figure 4:
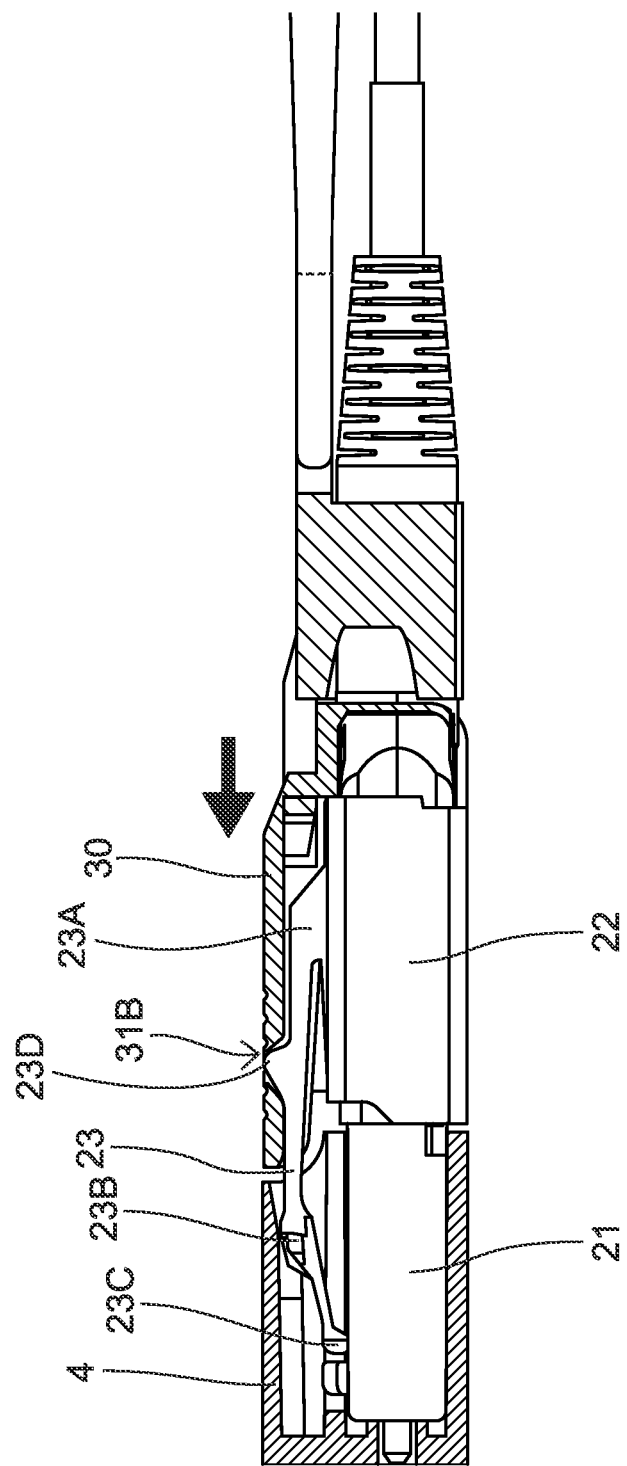
FIG. 4 is a cross-sectional view showing the connector plug 10 in a state that a slider 30 is slid in the inserting direction.

Hereafter, the configuration of attaching the connector plug 10 to the adapter 4 and the configuration of detaching the connector plug 10 from the adapter 4 will be explained. FIG. 3 is a cross-sectional view showing the connector plug 10 in a state that the slider 30 is slid in the detaching direction. FIG. 4 is a cross-sectional view showing the connector plug 10 in a state that the slider 30 is slid in the inserting direction.

In order to attach the connector plug 10 to the adapter 4, as shown by the arrow mark in FIG. 4, the slider 30 is pushed toward the inserting direction to move the whole connector plug 10 in the inserting direction. When the locking portion 23B of the latches 23 is in contact with the locking piece 4A (shown in FIG. 1) of the adapter 4, the latches 23 are elastically deformed and the locking portion 23B formed on the latches 23 is moved downward to approach the upper surface of the plug frame 21. Consequently, the locking portion 23B avoids the locking piece 4A of the adapter 4 and the connector plug 10 can be inserted deep into the adapter 4.

When the connector plug 10 is inserted deep into the adapter 4, the elastic deformation of the latches 23 is released. Thus, the locking portion 23B of the latches 23 is moved upward and the locking portion 23B of the latches 23 is locked to the locking piece 4A of the adapter 4 in a state that the end portion of the locking portion 23B in the detaching direction is in contact with the inserting direction side of the locking piece 4A.

As described above, the connector plug 10 is fitted to the adapter 4.

In order to detach the connector plug 10 from the adapter 4, as shown in the arrow mark in FIG. 3, the slider 30 is moved in the detaching direction. Consequently, the slider 30 is moved in the detaching direction with respect to the latches 23. Namely, from the state that the sliding protrusion 23D is housed in the sliding hole 31B, the sliding hole 31B is moved in the detaching direction with respect to the sliding protrusion 23D. When the lower surface of the slider 30 is slid on the inclined surface of the sliding protrusion 23D, downward force is applied to the latches 23 at a part of the sliding protrusion 23D. Consequently, in a state that the support portion 23A and the tip portion 23C serve as a fulcrum, the sliding protrusion 23D is pressed downward and the latches 23 are elastically deformed downward. The locking portion 23B formed on the latches 23 moves downward and approaches the upper surface of the plug frame 21. Consequently, the state that the locking portion 23B is locked to the locking piece 4A of the adapter 4 is released. Namely, the slider 30 is moved in the detaching direction with respect to the connector plug body 20 and the fitting between the adapter 4 and the connector plug body 20 is released. In this state, the whole connector plug 10 is moved in the detaching direction. Thus, the connector plug 10 can be pulled out of the adapter 4.

Figure 5:
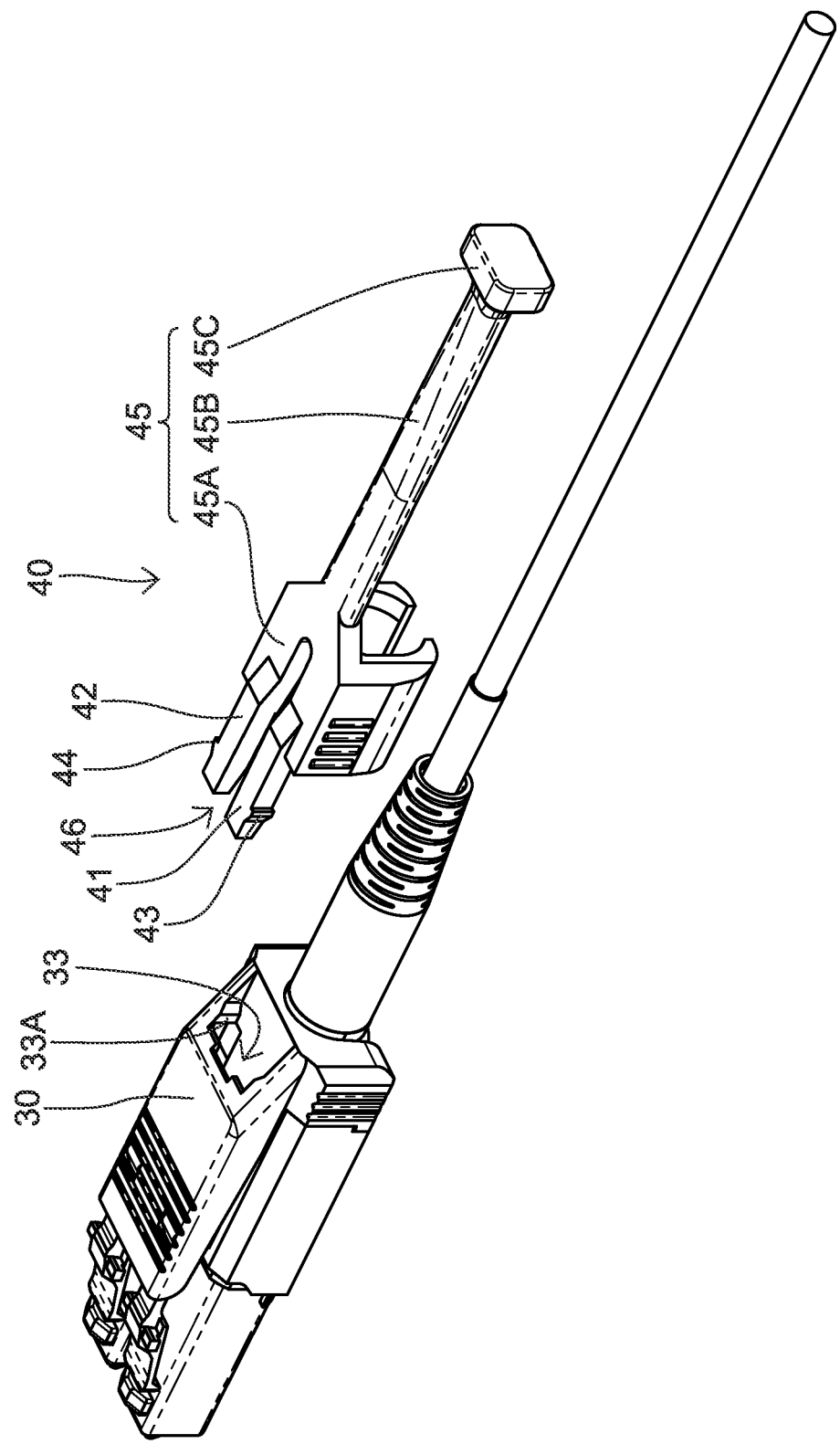
FIG. 5 is a perspective view of the connector plug 10 viewed from the detaching direction in a state that a jig 40 is detached.

Hereafter, the structure of the jig 40 will be explained. The jig 40 is used for moving the slider 30 in the detaching direction to detach the connector plug 10 from the adapter 4 and used for moving the connector plug 10 in the inserting direction to attach the connector plug 10 to the adapter 4. FIG. 5 is a perspective view of the connector plug 10 viewed from the detaching direction in a state that the jig 40 is detached. As shown in FIG. 5, the jig 40 is comprised of a first insertion portion 41, a second insertion portion 42 and an operation portion 45. Hereafter, the first insertion portion 41 and the second insertion portion 42 are referred to as insertion portions 41, 42. The insertion portions 41, 42 are a portion which can be inserted into a slot 33 provided on the slider 30 toward the inserting direction. The operation portion 45 is a portion operated by the operator. The operation portion 45 is extended in the detaching direction from the insertion portions 41, 42. The operation portion 45 is comprised of a cylindrical portion 45A which is continuously formed from the insertion portions 41, 42, a rod-shaped portion 45B which extends in the detaching direction from the rear side of the cylindrical portion 45A, and a handle portion 45C formed on an end portion in the detaching direction of the rod-shaped portion 45B.

FIG. 6 is a plan view of the jig 40. As shown in FIG. 6, a slit 46 is provided between the first insertion portion 41 and the second insertion portion 42 so that the first insertion portion 41 and the second insertion portion 42 are separated from each other by a predetermined distance D1. The slit 46 is formed on an approximately center in the width direction of the insertion portions 41, 42 from the end portion in the inserting direction of the insertion portions 41, 42 to the operation portion 45. In addition, the slit is formed in a semicircular shape in a plan view at the end portion of the operation portion 45 side. The insertion portions 41, 42 are integrally formed with the operation portion 45 by a same member. The insertion portions 41, 42 are extended toward the inserting direction by the same length from the operation portion 45.

The insertion portions 41, 42 have a first locking portion 43 and a second locking portion 44 which can be locked to the inner wall of the slot 33. The first locking portion 43 and the second locking portion 44 are located at the positions opposite to each other with respect to the slit 46. Namely, the first locking portion 43 and the second locking portion 44 are formed at positions symmetrical to each other (positions having different phases with each other by approximately 180°) with respect to the slit 46 as the center. This means that the first locking portion 43 and the second locking portion 44 are arranged at the positions symmetrical to each other in the inner wall of the slot 33. In other words, the first insertion portion 41 has the first locking portion 43 at an opposite side of the second insertion portion 42 so that the first locking portion 43 can be locked to the inner wall of the slot 33, and the second insertion portion 42 has the second locking portion 44 at an opposite side of the first insertion portion 41 so that the second locking portion 44 can be locked to the inner wall of the slot 33.

The first locking portion 43 is formed by a first protrusion 43A which is protruded from the first insertion portion 41 toward the inner wall of the slot 33. The second locking portion 44 is formed by a second protrusion 44A which is protruded from the second insertion portion 42 toward the inner wall of the slot 33. In a plan view, the first protrusion 43A and the second protrusion 44A have inclined surfaces 43A1, 44A1 at the inserting direction side so that an inclination amount is gradually reduced (i.e., width of the protrusion is gradually narrowed) toward the inserting direction. On the other hand, the first protrusion 43A and the second protrusion 44A have locking surfaces 43A2, 44A2 at the detaching direction side so that the locking surfaces 43A2, 44A2 are approximately perpendicular to the inserting direction and the detaching direction. The locking surfaces 43A2, 44A2 are locked to locking portions 33A of the inner wall of the slot 33. The locking portions 33A are provided on both left and right sides of the inner wall of the slot 33 at the positions to which the first protrusion 43A and the second protrusion 44A are locked. The details about the insertion of the insertion portions 41, 42 into the slot 33 and the engagement between the insertion portions 41, 42 and the slot 33 will be explained later.

FIG. 7 is a side view of the jig 40 viewed from the inserting direction. As shown in FIG. 7, the cylindrical portion 45A is formed in a rectangular cylindrical shape when viewed from the inserting direction. As shown in FIG. 1, the optical fiber cable 1 extending from the connector plug 10 in the detaching direction and the boot 1C can be inserted inside the cylindrical portion 45A. The cylindrical portion 45A has a size to be housed inside an outer shape of the connector plug 10 in a state that the insertion portions 41, 42 are inserted into the slot 33 of the slider 30 when viewed from the detaching direction. Because of this, the jig 40 does not obstruct the operation even when a plurality of adapters 4 is densely provided. In addition, even when a plurality of jigs 40 exists, the jigs 40 themselves do not interfere with each other.

The slit 46 formed between the insertion portions 41, 42 also extends to the cylindrical portion 45A. Namely, the slit 46 formed on the cylindrical portion 45A extends in the inserting direction. It can be also said that the insertion portions 41, 42 are divided into two by the slit 46. The cylindrical portion 45A is made of a material having elasticity. Gripping portions 45A1 are formed on both side surfaces of the cylindrical portion 45A so that the operator grasps the gripping portions 45A1 by fingers, for example. The gripping portions 45A1 are formed on the outer periphery of the cylindrical portion 45A at the positions opposite to each other in the width direction. The width of the slit 46 can be shortened (narrowed, reduced) by applying the force to the gripping portions 45A1 in an inside direction (inner direction, inward direction) from the outer side toward the slit 46 and elastically deforming the cylindrical portion 45A. In other words, the predetermined distance D1 between the first insertion portion 41 and the second insertion portion 42 can be shortened.

The cylindrical portion 45A has a notch (notch portion) 47 notched over an entire length of the cylindrical portion 45A in the axial direction. Namely, the cylindrical portion 45A has an approximately U-shape or an approximately C-shape when viewed from the detaching direction. Since the notch 47 is provided, the elastic deformation of the cylindrical portion 45A can be facilitated when the force is applied to the gripping portions 45A1 in an inside direction. A width W1 of the notch 47 is larger than a diameter of the optical fiber cable 1. Consequently, the optical fiber cable 1 can be inserted into the cylindrical portion 45A via the notch 47. In addition, the width W1 of the notch 47 is smaller than the maximum diameter of the boot 1C. Consequently, the cylindrical portion 45A is prevented from being removed from the boot 1C after the boot 1C is inserted through the cylindrical portion 45A. In addition, since the cylindrical portion 45A functions as a guide, the jig 40 is prevented from being used in an unexpected angle. The slit 46 is located on the upper surface of the cylindrical portion 45A, and the notch 47 is located on the lower surface of the cylindrical portion 45A. Accordingly, it can be said that the notch 47 is located at an opposite side of the slit 46 on an outer periphery of the cylindrical portion 45A. Namely, the slit 46 and the notch 47 are formed on the positions opposite to each other with respect to the portion of the cylindrical portion 45A to which the optical fiber cable 1 is inserted.

The rod-shaped portion 45B is integrally formed with the cylindrical portion 45A. The rod-shaped portion 45B has a predetermined length to extend toward the detaching direction. Since the rod-shaped portion 45B is provided, the connector plug 10 can be operated from the position separated in the detaching direction from the connector plug body 20 even when it is difficult to insert the fingers near the adapter 4. A breakable portion 45B1 is provided on the rod-shaped portion 45B so that the rod-shaped portion 45B can be broken (cut) at a predetermined position in the length direction after the connector plug 10 is attached to the adapter 4. Consequently, the rod-shaped portion 45B is prevented from obstructing the operation after the connector plug 10 is attached. The breakable portion 45B1 can be formed by one or more holes, one or more slits or both the holes and slits provided on the rod-shaped portion 45B, for example. The breakable portion 45B1 is located at a position nearer to the insertion portions 41, 42 (in the inserting direction side) compared to the end portion of the boot 1C in the detaching direction in a state that the insertion portions 41, 42 are inserted into the slot 33.

The handle portion 45C is formed integrally with the rod-shaped portion 45B. The handle portion 45C is a portion having a larger area than the rod-shaped portion 45B when viewed from the detaching direction. Although the handle portion 45C is formed in an approximately rectangular cross-sectional shape having a predetermined thickness in the present embodiment, the shape of the handle portion 45C is not limited to the above described shape. Since the handle portion 45C has a larger area compared to the rod-shaped portion 45B, the jig 40 can be pulled in the detaching direction if the fingers can touch a part of the handle portion 45C when the operator reaches his/her hand toward the jig 40 from the detaching direction.

Hereafter, the configuration of attaching the connector plug 10 to the adapter 4 and the configuration of detaching the connector plug 10 from the adapter 4 by using the jig 40 will be explained. FIG. 8 is a drawing showing a state of attaching the jig 40 to the slider 30. FIG. 9 is a drawing showing a state that the jig 40 is attached to the slider 30. In both drawings, a planar cross-sectional view (A-A cross-section, B-B cross-section) is arranged above the front view while aligning the position in the longitudinal direction.

As shown in the arrow mark in FIG. 8, the insertion portions 41, 42 of the jig 40 are inserted into the slot 33 of the slider 30. Since the width of the opening of the slot 33 is wider than the width between the outer surface of the first protrusion 43A and the outer surface of the second protrusion 44A, the tip of the insertion portions 41, 42 are inserted into the slot 33 without interfering with the opening of the slot 33. When the insertion portions 41, 42 are inserted further inside the slot 33, the inclined surfaces 43A1, 44A1 provided on the first protrusion 43A and the second protrusion 44A are in contact with the locking portions 33A provided on the inner wall of the slot 33. Here, the locking portions 33A have an inclined surface 33A1 so that the width of the slot 33 is gradually narrowed toward the inserting direction. Accordingly, when the insertion portions 41, 42 are further pushed into the slot 33 from the state that the first protrusion 43A and the second protrusion 44A are in contact with the locking portions 33A, the inclined surface 43A1 of the first protrusion 43A and the inclined surface 44A1 of the second protrusion 44A are slid on the inclined surface 33A1 of the locking portions 33A and the predetermined distance D1 between the insertion portions 41, 42 is shortened. Consequently, the first protrusion 43A and the second protrusion 44A ride over the locking portions 33A and are inserted inside the slot 33. FIG. 9 shows the state that the insertion portions 41, 42 are completely inserted into the slot 33 and the first protrusion 43A and the second protrusion 44A are locked to the locking portions 33A. Here, the locking portions 33A have a locking surface 33A2 which is approximately perpendicular to the inserting direction and the detaching direction in a plan view. The locking surface 43A2 of the first protrusion 43A and the locking surface 44A2 of the second protrusion 44A are locked by the locking surface 33A2. Although the operator can shorten the predetermined distance D1 by elastically deforming the cylindrical portion 45A to the inner side, the predetermined distance D1 can be also shortened when the inclined surfaces are slid with each other without operating the cylindrical portion 45A.

As shown in FIG. 9, the jig 40 is further moved in the inserting direction in a state that the first locking portion 43 and the second locking portion 44 are locked to the inner wall of the slot 33, the end portion in the inserting direction of the cylindrical portion 45A of the jig 40 pushes the whole connector plug 10 in the inserting direction. Therefore, only by the operation of pushing the jig 40 toward the inserting direction, the connector plug 10 and the adapter 4 can be fitted with each other. Since the rod-shaped portion 45B is formed on the rear side (detaching direction side) of the operation portion 45, the connector plug 10 can be fitted to the adapter 4 without deeply inserting the hand of the operator even when a plurality of adapters 4 is densely provided.

As shown in FIG. 9, when the jig 40 is moved in the detaching direction in a state that the first locking portion 43 and the second locking portion 44 are locked to the inner wall of the slot 33, the locking surfaces 43A2, 44A2 of the first protrusion 43A and the second protrusion 44A push the locking surface 33A2 of the slider 30 in the detaching direction. Consequently, the slider 30 can be moved in the detaching direction with respect to the connector plug body 20. As described above, since the latches 23 can be pushed downward by sliding the slider 30 in the detaching direction and the fitting of the connector plug body 20 to the adapter 4 can be released, the connector plug 10 can be detached from the adapter 4 by further pulling the jig 40 toward the detaching direction. Namely, only by the operation of pulling the jig 40 toward the detaching direction, the connector plug 10 can be released from the locking to the adapter 4 and the connector plug 10 can be pulled out of the adapter 4.

FIG. 10 is a drawing showing a state of detaching the jig 40 from the slider 30. FIG. 11 is a drawing showing a state that the jig 40 is detached from the slider 30. In both drawings, a planar cross-sectional view (C-C cross-section, D-D cross-section) is arranged above the front view while aligning the position in the longitudinal direction. As shown in the arrow mark in FIG. 10, the force is applied to the cylindrical portion 45A in an inside direction to elastically deform the cylindrical portion 45A and shorten the predetermined distance D1 between the insertion portions 41, 42. When the width between the outer surfaces of the first locking portion 43 and the second locking portion 44 becomes smaller than the width between the two locking portions 33A, the first locking portion 43 and the second locking portion 44 can be released from the locking of the locking portions 33A provided on the inner wall of the slot 33. In that state, as shown in the arrow mark in FIG. 11, when the jig 40 is pulled in the detaching direction, the jig 40 can be detached from the slider.

As explained above, even when a plurality of adapters 4 is densely provided and it is difficult to reach the connector plug body 20 or the slider 30, the connector plug 10 can be attached and detached by using the jig 40. Since the configuration of locking the insertion portions 41, 42 to the slot 33 by changing the predetermined distance D1 between the insertion portions 41, 42, it is not required to elastically deform the slider 30 itself. Consequently, the strength of the slider 30 can be ensured and the strength of the jig 40 itself can be easily ensured. In addition, since the jig 40 is locked to the slot 33 at two points of the first locking portion 43 and the second locking portion 44, the reliability of the attachment and detachment can be improved. Since the jig 40 has a size to be housed inside the outer shape of the connector plug 10 when viewed from the detaching direction, the jig 40 can be used even when a plurality of adapters 4 is densely provided. In addition, since the boot 1C is inserted into the cylindrical portion 45A, the cylindrical portion 45A is prevented from being deformed excessively when the cylindrical portion 45A is elastically deformed to the inner side. In addition, since the cylindrical portion 45A functions as a guide, the jig 40 is prevented from being used in an unexpected angle. Furthermore, the length of the jig 40 can be shortened by breaking the rod-shaped portion 45B at an intermediate portion to remove the handle portion 45C side after the jig 40 is attached.

In the above described embodiments, the insertion portions 41, 42 and the operation portion 45 are integrally formed and width of the slit 46 is shortened by elastically deforming the operation portion 45. However, the present invention is not limited to the above described configuration. For example, it is also possible to use separately formed first insertion portion 41, second insertion portion 42 and operation portion 45 by connecting them with each other. In addition, the method of reducing the distance between the first insertion portion 41 and the second insertion portion 42 is not limited to the elastic deformation. For example, it is also possible to connect the first insertion portion 41 and the second insertion portion 42 via a mechanical means such as a spring so that the distance D1 can be shortened by the mechanical means.

In the above described embodiments, the slit 46 is linearly formed to have an approximately constant width. However, the shape of the slit 46 is not limited to the above described shape. For example, it is also possible to form the slit 46 so that the width of the slit 46 is gradually increased toward the opening side and to form the wall surface of the slit 46 in a curved shape. In addition, the predetermined distance D1 between the insertion portions 41, 42 can be formed by other means than the slit 46. For example, the configuration of forming the first insertion portion 41 and the second insertion portion 42 by bending a thin metal plate in a U-shape to form the predetermined distance D1 between the first insertion portion 41 and the second insertion portion 42 is also included in the present invention.

In the above described embodiments, the gripping portions 45A1 are provided on the positions opposite to each other with respect to the slit 46 in the width direction of the operation portion 45. However, the direction of applying the force to the operation portion 45 is not limited to the width direction. It is also possible to arrange the two gripping portions 45A1 in the height direction and arrange the positions rotated by an arbitrary angle.

In the above described embodiments, the first locking portion 43 and the second locking portion 44 are formed by the first protrusion 43A and the second protrusion 44A protruded toward the inner wall of the slot 33. However, the method of locking the insertion portions 41, 42 to the inner wall of the slot 33 is not limited to the above described method. For example, it is also possible to lock the recesses provided on the insertion portions 41, 42 to the protrusions provided on the inner wall of the slot 33.

In the above described embodiments, the operation portion 45 is formed by the cylindrical portion 45A, the rod-shaped portion 45B and the handle portion 45C. However, the configuration of the operation portion 45 is not limited to the above described configuration. Any configurations can be used as long as the predetermined distance D1 between the insertion portions 41, 42 can be shortened. For example, it is also possible to form the operation portion 45 having a plate shape or a rod shape in a U-shape in a plan view without forming the cylindrical portion 45A. Even when the cylindrical portion 45A is formed, the cross-sectional shape of the cylindrical portion 45A is not limited to the rectangular shape. The cross-sectional shape of the cylindrical portion 45A can be formed in a tubular shape having a circular cross-section or a polygonal cross-section. Furthermore, it is also possible to omit the rod-shaped portion 45B and the handle portion 45C.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

DESCRIPTION OF THE REFERENCE NUMERALS

1: optical fiber cable, 1A: optical fiber, 1B: ferrule, 1C: boot, 2: device, 3: panel, 4: adapter, 4A: locking piece, 10: connector plug, 20: connector plug body, 21: plug frame, 22: latch frame, 23: latch, 23A: support portion, 23B: locking portion, 23C: tip portion, 23D: sliding protrusion, 30: slider, 31: cover portion, 31A: sliding groove, 31B: sliding hole, 32: gripping portion, 33: slot, 33A: locking portion, 40: jig, 41: first insertion portion, 42: second insertion portion, 43: first locking portion, 43A: first protrusion, 44: second locking portion, 44A: second protrusion, 45: operation portion, 45A: cylindrical portion, 45B: rod-shaped portion, 45C: handle portion, 46: slit, 47: notch, D1: predetermined distance, W1: width of notch

What is claimed is:

1. A jig used for a connector plug, the connector plug comprising:
    a connector plug body to be fitted to an adapter; and
    a slider supported on the connector plug body so as to be movable in a detaching direction which is a direction of detaching the connector plug body from the adapter, a fitting between the adapter and the connector plug body being released when the slider is moved in the detaching direction with respect to the connector plug body, the jig comprising:
        an insertion portion which can be inserted into a slot provided on the slider in an inserting direction which is an opposite direction of the detaching direction; and
        an operation portion extended in the detaching direction from the insertion portion, wherein
    the insertion portion is comprised of a first insertion portion and a second insertion portion which are separated from each other by a predetermined distance,
    the first insertion portion has a first locking portion at an opposite side of the second insertion portion so that the first locking portion can be locked to an inner wall of the slot,
    the second insertion portion has a second locking portion at an opposite side of the first insertion portion so that the second locking portion can be locked to the inner wall of the slot,
    the slider can be moved in the detaching direction when the jig is moved in the detaching direction in a state that the first locking portion and the second locking portion are locked to the inner wall of the slot, and
    the state that the first locking portion and the second locking portion are locked to the inner wall of the slot can be released when a force is applied to the operation portion in an inside direction to shorten the predetermined distance.

2. The jig according to claim 1, wherein
    the first insertion portion, the second insertion portion and the operation portion are integrally formed with each other by a same member,
    a slit is provided between the first insertion portion and the second insertion portion so that the first insertion portion and the second insertion portion are separated from each other by the predetermined distance, and
    the predetermined distance can be shortened by elastically deforming the operation portion.

3. The jig according to claim 1, wherein
    the first locking portion includes a first protrusion protruded from the first insertion portion toward an inner wall of the slot, and
    the second locking portion includes a second protrusion protruded from the second insertion portion toward an inner wall of the slot.

4. The jig according to claim 1, wherein
    the adapter and the connector plug body can be fitted with each other when the jig is moved in the inserting direction so that an end portion in the inserting direction of the jig pushes the connector plug.

5. The jig according to claim 1, wherein
    the operation portion has a cylindrical portion formed in a cylindrical shape,
    an optical fiber cable extending from the connector plug in the detaching direction and a boot covering the optical fiber cable can be inserted inside the cylindrical portion,
    the cylindrical portion has a notch notched over an entire length of the cylindrical portion in an axial direction,
    a width of the notch is larger than a diameter of the optical fiber cable and smaller than a maximum diameter of the boot, and
    the cylindrical portion has a size to be housed inside an outer shape of the connector plug when viewed from the detaching direction in a state that the insertion portion is inserted into the slot.

6. The jig according to claim 5, wherein
    the operation portion has a breakable portion at a position located nearer to the insertion portion compared to an end portion of the boot in the detaching direction in a state that the insertion portion is inserted into the slot.

7. A connector plug, comprising:
    a connector plug body to be fitted to an adapter; and
    a slider supported on the connector plug body so as to be movable in a detaching direction which is a direction of detaching the connector plug body from the adapter, a fitting between the adapter and the connector plug body being released when the slider is moved in the detaching direction with respect to the connector plug body, wherein
    the connector plug further comprising:
        a jig detachably attachable to the slider, the jig comprising:
- an insertion portion which can be inserted into a slot provided on the slider in an inserting direction which is an opposite direction of the detaching direction; and
- an operation portion extended in the detaching direction from the insertion portion, the insertion portion is comprised of a first insertion portion and a second insertion portion which are separated from each other by a predetermined distance, the first insertion portion has a first locking portion at an opposite side of the second insertion portion so that the first locking portion can be locked to an inner wall of the slot, the second insertion portion has a second locking portion at an opposite side of the first insertion portion so that the second locking portion can be locked to the inner wall of the slot, the slider can be moved in the detaching direction when the jig is moved in the detaching direction in a state that the first locking portion and the second locking portion are locked to the inner wall of the slot, and the state that the first locking portion and the second locking portion are locked to the inner wall of the slot can be released when a force is applied to the operation portion in an inside direction to shorten the predetermined distance.

8. A cable to which the connector plug according to claim 7 is attached at an end portion of the cable.

\* \* \* \* \*